No. 760,747. PATENTED MAY 24, 1904.
H. P. MAXIM.
MOTOR SUSPENSION FOR VEHICLES.
APPLICATION FILED JUNE 13, 1903.

NO MODEL. 3 SHEETS—SHEET 1.

Fig. 1.

Fig. 5.

Witnesses:
Robert C. Totten
H. G. Dieterich

Inventor:
Hiram Percy Maxim
By Kay Totten & Winter
Attorneys:

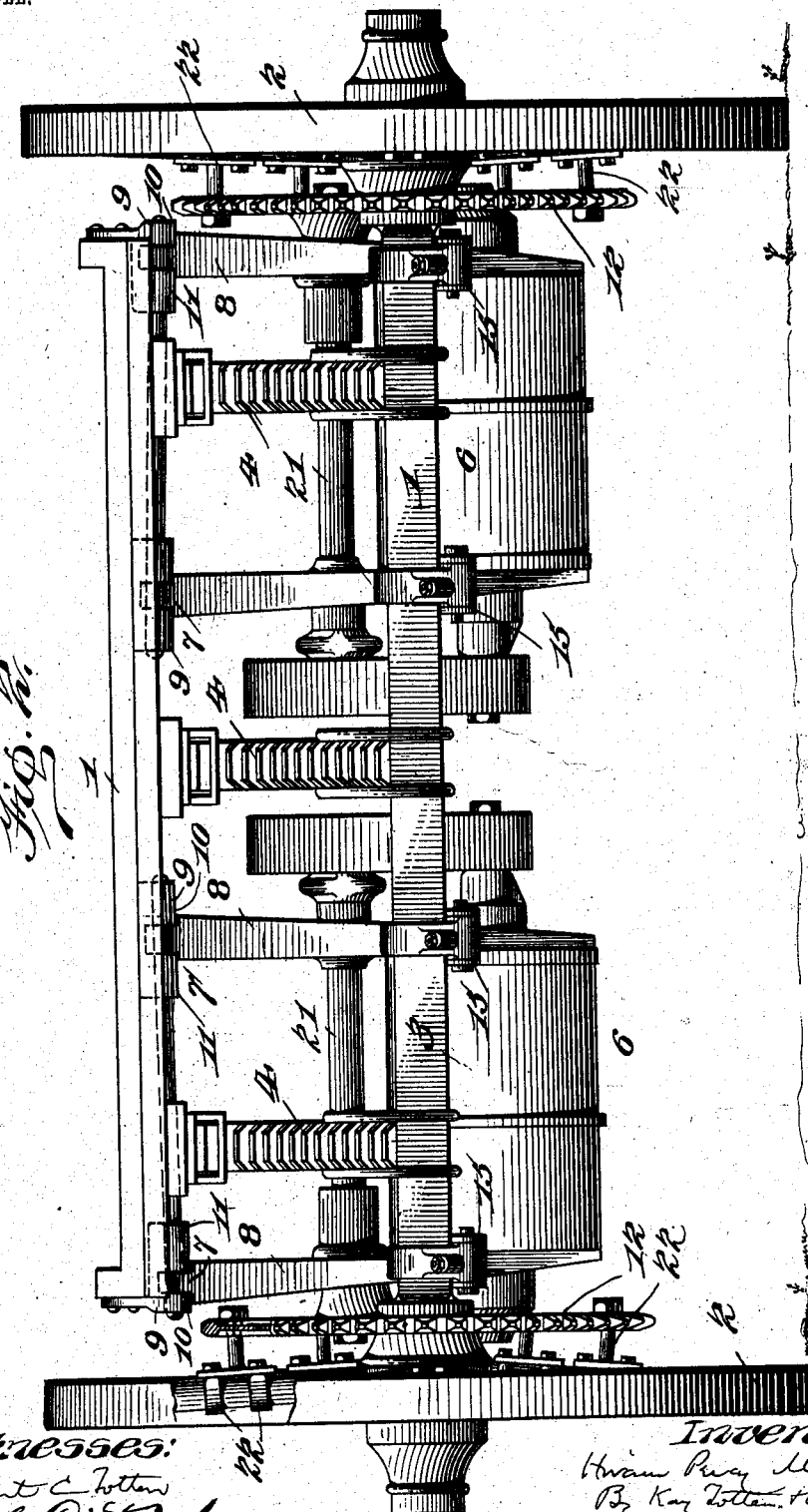

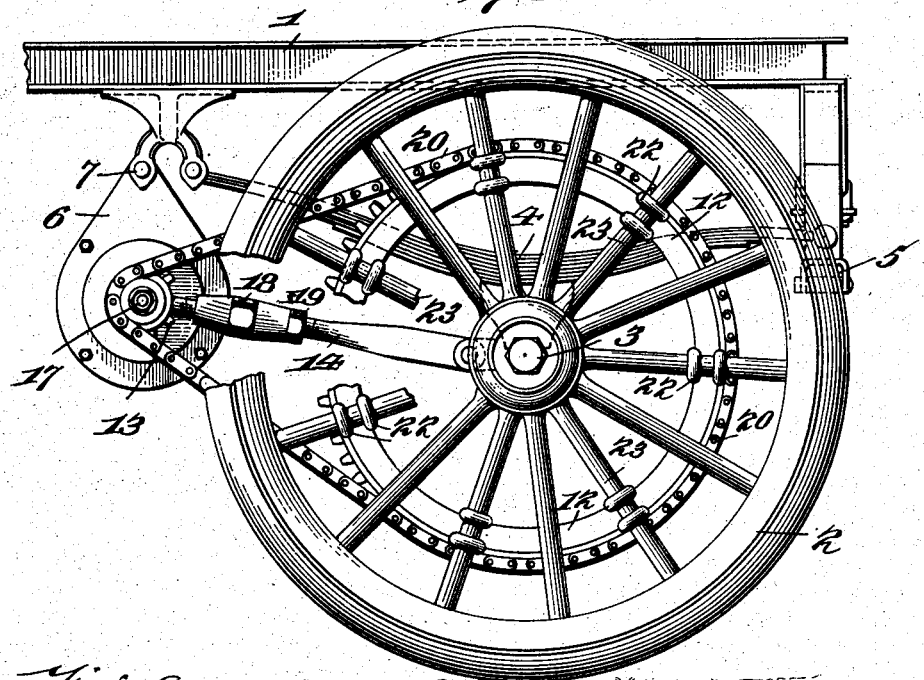

No. 760,747.

Patented May 24, 1904.

UNITED STATES PATENT OFFICE.

HIRAM PERCY MAXIM, OF PITTSBURG, PENNSYLVANIA.

MOTOR SUSPENSION FOR VEHICLES.

SPECIFICATION forming part of Letters Patent No. 760,747, dated May 24, 1904.

Application filed June 13, 1903. Serial No. 161,249. (No model.)

*To all whom it may concern:*

Be it known that I, HIRAM PERCY MAXIM, a resident of Pittsburg, in the county of Allegheny and State of Pennsylvania, have invented a new and useful Improvement in Motor Suspension for Vehicles; and I do hereby declare the following to be a full, clear, and exact description thereof.

My invention relates to motor-vehicles, and more especially to the manner of suspending the motor therefrom.

The object of my invention is to improve motor suspension for vehicles, so that the construction of the vehicle is greatly cheapened and simplified, and to so suspend the motor that all driving strains will be self-contained between the motor and driving-wheel axle and will not affect or be affected by the vehicle-springs.

A further object is so to suspend the motor of motor-vehicles that it will be possible to use all standard vehicle parts—such as springs, axles, wheels, and other materials—which are always cheap and easily obtainable and which by long years of experience have been found most satisfactory for vehicle use.

To the accomplishment of the aforesaid objects the invention consists, generally stated, in suspending the motor from the body of the vehicle by a hinge-joint, arranging suitable driving-gearing between the motor and the driving-wheel, and providing means, such as a distance-rod or the like, to maintain the motor approximately a uniform distance from the axis of the driving-wheel.

The invention also consists in certain details of construction hereinafter described and claimed.

In the accompanying drawings, Figure 1 is a side view of a portion of a motor-vehicle, showing my invention applied thereto. Fig. 2 is a rear elevation of the same. Figs. 3 and 4 are side views showing slight modifications, and Fig. 5 is a detail sectional view of the manner of connecting the distance-rod in Fig. 3.

In the drawings the vehicle-body is shown at 1, the driving-wheel at 2, and the axle at 3. 4 represents one of the side springs of a platform construction, and 5 the cross-spring 5° thereof.

All parts of the vehicle thus far described may be of the usual standard vehicle construction such as used by any vehicle-manufacturer. In fact, as will hereinafter appear, my invention does not necessitate the construction of any special form of vehicle, but can be applied to any existing vehicle.

The motor is shown at 6. This will be inclosed in the usual casing, as is common, and in carrying out my invention said motor and casing will be suspended from the body of the vehicle by a simple hinge-joint 7. One member of this hinge-joint will of course be formed on the motor-casing or arm 8 thereof and the other may be a simple hinge member or the like, which may be bolted to the vehicle-body; but for simplicity I prefer to make the spring-hanger 9 with two eyes, one for the attachment of the spring itself and the other to form the hinge member from which the motor is suspended. There are two suspending-arms 8, one at each end of the motor, and preferably the hinge is a double-jawed one—that is, one member has two jaws, as 10 and 11—so that the severe side thrusts or jolts to which vehicles are subjected will not bring all the lateral strain on one of the motor-arms. The double-jawed hinge offers a resistance to lateral motion no matter in which direction it comes, so that each arm takes a portion of the side strains.

All wagon-wheels are dished, and hence the plane of the wheels are slightly inclined from a true vertical position, and this causes the driving-sprockets 12 on the wheels to be also slightly inclined. It is desirable to incline the sprocket 13 on the motor so it will aline with the sprocket on the wheel. This can be conveniently accomplished by mounting the motors so that their outer ends are slightly lower than their inner ends. This is clearly indicated in Fig. 2.

Suitable means are provided for maintaining the motor an approximately uniform distance at all times from the vehicle-axle. Various arrangements and means for this purpose may be employed, and I have shown for this purpose a distance-rod 14, which is hinged at its inner end to a clip 15, secured to the vehicle-axle, and its opposite end is hinged to the motor-casing, so that as the motor moves up and down with the movement of the vehicle-body this rod will hold the same approximately a uniform distance from the axle, thus enabling the driving-gear between the motor and driving-wheel to always remain in proper driving contact. Preferably one such rod will be placed at each end of the motor and also preferably each vehicle will be provided with two motors, as indicated in Fig. 2, one for each of the rear wheels of the vehicle. In such cases four distance-rods will be employed. This, however, is not absolutely essential. In Figs. 1 and 4 the distance-rod is connected to the motor-casing by an ordinary hinge connection and is substantially parallel to the line drawn through the centers of the motor-sprocket and the sprocket on the vehicle-wheel. In Figs. 3 and 5 the distance-rod is provided with an eye 16, which encircles a projection 17 of the motor-bushing bearing. This manner of connecting the distance-rod allows it to be brought very close to the line of pull of the chain, so that the pull of the chain is resisted close to the point where it is applied, and there is practically no overhang or added friction on any rotating part. The distance-rod is adjustable, as by means of the turnbuckle 18, and is also swiveled, so as to permit of the rocking of the body and motor with relation to the axle. Such rocking motion would cause torsional strains in the distance-rods were they not swiveled. This swiveling is conveniently accomplished by having a single locking-nut 19 in contact with the turnbuckle, thus keeping the turnbuckle from turning and at the same time permitting the two parts of the distance-rod to have rotary movement relatively to each other.

Any suitable driving-gearing will be arranged between the motor and the driving-wheel 2. Preferably, however, this gearing will be of the sprocket-and-chain type, which is comparatively cheap and in the use of which exact center locations are not necessary, as approximations will be sufficient. Consequently the hinging of the distance-rod 14 to the clip 15 will answer the purpose, and said hinge-joint need not be at the mathematical axis of the driving-wheel. The distance-rod, it will be observed, is so connected to the motor-casing that the arc described about the hinge between said rod and the clip 15 will always lie in or within the arc described about the mathematical axis of the driving-wheel, so that as the motor swings up and down with the vehicle-body the drive-chain may at times slacken somewhat, but will never tighten. A slight slackness, however, will not affect the driving power of the chain, whereas the sudden tightening thereof might cause breakage. The arrangement shown absolutely prevents the latter. The sprocket-chain is shown at 20, and this in Figs. 1 and 2 is connected to a sprocket-wheel 13 on the counter-shaft 21 of the motor, and also passes over the sprocket-wheel 12, secured to the vehicle drive-wheel. This sprocket-wheel 12 for simplicity is provided with attaching means of such a construction that it can be attached to any standard wagon-wheel, so as not to necessitate special constructions of wheels. These attaching means comprise clips 22, which pass around the wheel-spokes 23 and are of general U shape and provided on their inner ends with threaded shanks which pass through openings in the sprocket-wheel and are secured in place by ordinary nuts.

In the modification shown in Fig. 4 the same principle as above described is followed, except that the motor is shown suspended back of the axle instead of in front thereof. In both the forms shown in Figs. 1 and 4 the motor is provided with a counter-shaft 21, geared at its inner end to the inner end of the motor-shaft, so as to reduce the speed, and the sprocket is on the outer end of this counter-shaft. In the case of small wagons, however, where the speed wanted is high enough to enable a single gear-reduction to be employed, such as shown in Fig. 3, the sprocket-pinion 13 is placed directly upon the end of the motor-shaft itself, and the counter-shaft is omitted. In this form it will be noticed that the forward spring hanger or bracket 9 is made double—that is, with two downwardly-projecting arms, to one of which is attached the spring and to the other of which the motor is hinged.

It will be observed that with my invention the motor is suspended entirely from the body of the vehicle, so that it is fully protected by the cushioning effects of the springs and is only slightly effected by the jolting and jarring of the axle. Furthermore, by this arrangement all of the driving strains are confined between the motor and the vehicle driving-wheel and are not transmitted to the vehicle-body. The construction, furthermore, is such that outside of the motor driving-gear, sprocket-wheels, and distance-rods practically no modification of standard vehicle construction need be made. The hinge-joint for the motor can either be separate from the spring-hanger or a modified or lengthened spring-hanger may be supplied. In any event, however, any standard vehicle construction may be employed and all standard parts of vehicles may be used. These standard parts are not only cheap and easy to obtain, but it has been found by years of experience that they are absolutely the best that can be made. My motor and driving connection can be applied to these standard parts with ease and by an ordinary mechanic, so that the cost of vehicles is very largely reduced and at the same time an efficient driving means therefor is provided.

What I claim as my invention, and desire to secure by Letters Patent, is—

1. In a motor-vehicle, the combination with the vehicle-body and driving-wheel therefor, of a motor suspended from the body by a movable connection, said motor having a main shaft and a counter-shaft, gearing between said main shaft and counter-shaft on the inner ends thereof, a sprocket-chain connecting the outer end of said counter-shaft with the vehicle-wheel, a projecting bushing at the counter-shaft bearing, and a distance-rod hinged directly to the wheel-axle and encircling said bushing projection.

2. In a motor-vehicle, the combination with a vehicle-body, of wheels and axle therefor, springs for supporting the body on said axle, hangers for connecting said springs to the body, one of said hangers being provided with two eyes or loops, a motor suspended from one of said eyes or loops, driving-gearing arranged between the motor and driving-wheel, and a distance-rod between the motor and driving-wheel axle.

In testimony whereof I, the said HIRAM PERCY MAXIM, have hereunto set my hand.

HIRAM PERCY MAXIM.

Witnesses:
G. C. RAYMOND,
ROBERT C. TOTTEN.